(12) United States Patent
Kagita et al.

(10) Patent No.: US 6,466,255 B1
(45) Date of Patent: Oct. 15, 2002

(54) STEREOSCOPIC VIDEO DISPLAY METHOD AND APPARATUS, STEREOSCOPIC VIDEO SYSTEM, AND STEREOSCOPIC VIDEO FORMING METHOD

(75) Inventors: Junji Kagita; Shigeru Harada, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/482,086

(22) Filed: Jan. 13, 2000

(51) Int. Cl.[7] ............................................. H04H 13/00
(52) U.S. Cl. ...................................................... 348/42
(58) Field of Search .......................... 348/42–46, 51–60, 348/47, 82; 345/419, 112, 413, 32; H04N 13/00

(56) References Cited

U.S. PATENT DOCUMENTS

| | | | |
|---|---|---|---|
| 5,924,870 A | * 7/1999 | Brosh et al. | 434/365 |
| 5,929,859 A | * 7/1999 | Meijers | 345/419 |
| 6,005,607 A | * 12/1999 | Uomori et al. | 348/42 |
| 6,163,337 A | * 12/2000 | Azuma et al. | 348/43 |
| 6,201,566 B1 | * 3/2001 | Harada et al. | 348/51 |
| 6,259,426 B1 | * 7/2001 | Harada et al. | 345/112 |
| 6,329,987 B1 | * 12/2001 | Gottfried et al. | 345/419 |

* cited by examiner

*Primary Examiner*—Chris Kelley
*Assistant Examiner*—Tung T. Vo
(74) *Attorney, Agent, or Firm*—Jay H. Maioli

(57) ABSTRACT

In a foreground/background discriminating circuit based on focusing, a leading edge of a boundary portion is detected from a video signal and a parallax control signal is outputted on the basis of the detected leading edge. Similarly, in foreground/background discriminating circuits based on color differences and based on a luminance, a chroma component and a luminance component of the video signal are detected and parallax control signals are generated on the basis of the detected chroma and luminance components, respectively. In a multiplier, the parallax control signals generated from the foreground/background discriminating circuits are multiplied. In a parallax limiting circuit, a delay amount control signal for a left video signal and a delay amount control signal for a right video signal are formed in a manner such that a binocular parallax amount lies within a predetermined value and within a range of an amount such that the existence of the parallax is recognized clearly.

12 Claims, 5 Drawing Sheets

STEREOSCOPIC VIDEO DISPLAY METHOD AND APPARATUS, STEREOSCOPIC VIDEO SYSTEM, AND STEREOSCOPIC VIDEO FORMING METHOD

BACKGROUND OF THE INVENTION

1. Field of the Invention

The invention relates to a stereoscopic video display method and apparatus, a stereoscopic video system, and a stereoscopic video forming method, a natural stereoscopic sense can be obtained by limiting a parallax amount between a target and another object.

2. Description of the Related Art

When the person sees a target, a focal point is set only to a position near the target existing at a center of a field of view and an object existing at a position of out-of-focus is recognized as a blurred object. Therefore, the person hardly recognizes a large parallax.

For example, a method and an apparatus which can obtain effectively a stereoscopic sense of not only a moving object but also a still object from a 2-dimensional video signal (composite color video signal) are disclosed in JP-A-10-276455.

FIG. 1 shows a block diagram of such an apparatus and relates to an example of a projection type display using two projectors for displaying right and left video images, respectively. The position in the horizontal direction on a screen is controlled in accordance with boundary information of an inputted video signal, thereby generating a parallax between the right and left video images.

A 2-dimensional video signal supplied to an input terminal 51 is supplied to a Y/C separating circuit 52, by which a luminance signal Y and a chrominance signal C are separated. The chrominance signal C is supplied to a color demodulating circuit 53. The color demodulating circuit 53 performs a color demodulation to the supplied chrominance signal C, thereby generating two color difference signals (R-Y and B-Y). The luminance signal Y is supplied to a variable delay circuit 54L. The color difference signals R-Y and B-Y are supplied to delay circuits 55L and 56L each having a fixed delay amount. A symbol "L" indicates a left video signal path. A right video signal path is expressed by a symbol "R". Since the right video signal path is similar to the left video signal path, its description is omitted.

Output signals of the variable delay circuit 54L and delay circuits 55L and 56L are supplied to a matrix circuit 57L. Three primary color signals R, G, and B are formed by the matrix circuit 57L and supplied to a CRT driving circuit 59L through a preamplifier 25 58L.

A CRT 60L for projection is driven by the CRT driving circuit 59L and a left video image is displayed on a screen 62. Similarly, a CRT 60R for projection is driven by a CRT driving circuit 59R and a right video image is displayed on the screen 62. In this instance, the right and left video images are overlapped and displayed so as not to be deviated to the same position on the screen 62. The left video image which is projected by the CRT 60L is an image which passed through a horizontal polarizing filter 61L. On the other hand, the right video image which is projected by the CRT 60R is an image which passed through a vertical polarizing filter 61R.

By using glasses 63 having a horizonal polarizing filter 64L for the left eye and a vertical polarizing filter 64R for the right eye, the user can separately see the video images displayed on the screen 62 by the CRTs 60L and 60R.

The left and right video images having parallax information are formed being controlled so as to deviate the horizontal positions of the left and right video images in the opposite directions in accordance with boundary information in the inputted video signal by the variable delay circuits 54L and 54R. In case of an object having a large amount of boundary information, the object image is determined to be a foreground. On the other hand, in case of an object having a small amount of boundary information, the object image is determined to be a background. The amount of boundary information is detected on the basis of the luminance signal Y from the Y/C separating circuit 52. That is, a detection signal Sd is formed by allowing the luminance signal Y to pass through a high pass filter 65 and a rectifying circuit 66.

The high pass filter 65 detects a high frequency component in the luminance signal Y. The high frequency component includes pulses of a positive polarity and a negative polarity. The rectifying circuit 66 rectifies an output signal of the high pass filter 65 and generates the detection signal Sd having a positive or negative polarity.

The detection signal Sd is supplied to the variable delay circuit 54L as a signal to control the delay amount and also supplied to an inverter 67. A detection signal Sd' inverted by the inverter 67 is supplied to the variable delay circuit 54R as a signal to control the delay amount.

By supplying the detection signals Sd and Sd' to the variable delay circuits 54L and 54R, the positions in the horizontal direction of the left and right video images are controlled so as to mutually move in the opposite directions, thereby allowing an image of the object having the boundary information to be formed as a fusion image onto one of the front and rear surfaces of the screen 62.

OBJECTS AND SUMMARY OF THE INVENTION

It is, therefore, an object of the invention to provide stereoscopic video display method and apparatus which can obtain a natural stereoscopic sense of limiting a parallax as compared with the existing stereoscopic video display method.

It is an object of the invention to obtain a stereoscopic sense of a parallax between the right and left eyes and provide a stereoscopic video system which gives a relative parallax limited to a value within a predetermined amount between a foreground and a background which are discriminated from a video signal.

A clue of a foreground/background relation is extracted from a video signal inputted to a foreground/background discriminating circuit based on a focus, color difference signals, and a luminance signal. An amplitude is limited for the extracted clue, and a control signal is supplied to variable delay circuits for delaying a right video image and a left video image. In the variable delay circuits, a delay according to a level of the control signal is performed synchronously with the control signal and the right and left video images are outputted.

It is an object of the invention to provide a stereoscopic video system comprising means for giving a relative parallax to a foreground and a background which are discriminated from right and left video signals photographed by two cameras and means for limiting the relative parallax to a value within a predetermined amount and to provide a stereoscopic video forming method for such a system.

Since a parallax between a target and another object is expressed only by the relative parallax instead of an absolute parallax, a natural stereoscopic image can be realized. Since field memories are not used when converting 2-dimensional video images to a 3-dimensional video image, the circuit scale can be small enough.

DETAILED DESCRIPTION OF THE PREFERRED EMBODIMENTS

First, a function for stereoscopic viewing in the human visual sense will be described. When seeing a target with a background, a difference of a viewing range and a range where the background is hidden, namely, a parallax occurs between images of the eyes due to such conditions; a distance and a position of the target and the background, a viewing range from the shape of the target and a range where the background is hidden. The brain detects a sense of distance by an amount of such a parallax and perceives an accurate stereoscopic image. Such a parallax is called the absolute parallax.

On the other hand, the brain presumes a stereoscopic structure or a depth and can reconstruct a stereoscopic sense from a perspective expression in the video images and various clues such as degrees of a kinetic parallax, overlap or shielding of the targets, and the like besides the parallax between the right and left eyes.

By giving a small amount of parallax to the video image which is seen by the left eye and the video image which is seen by the right eye, a natural stereoscopic image can be recognized. Such a parallax given to the targets within the field of view as mentioned above is called the relative parallax.

Figure 1:
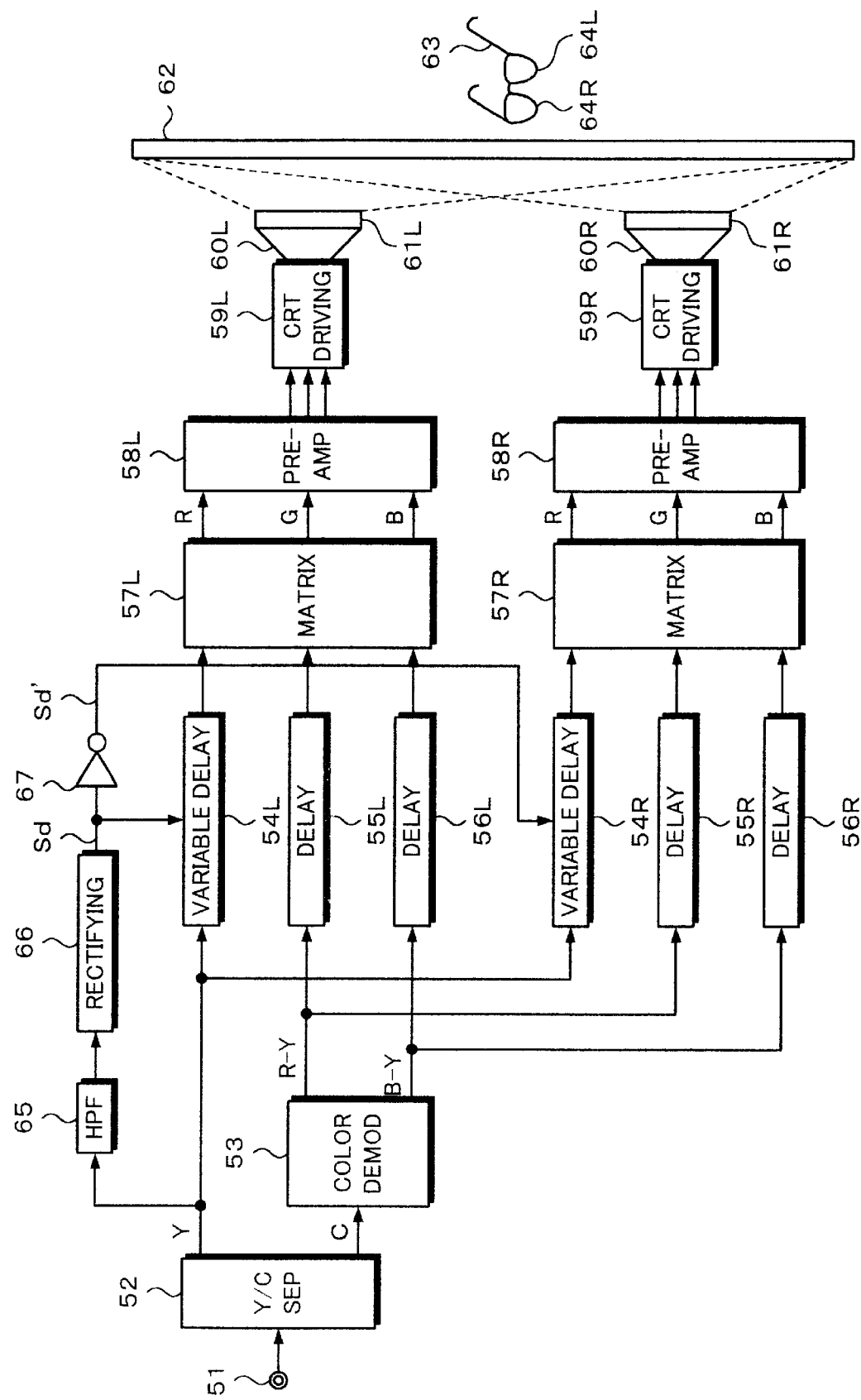
FIG. 1 is a block diagram for explanation of a conventional technique.
Figure 2:
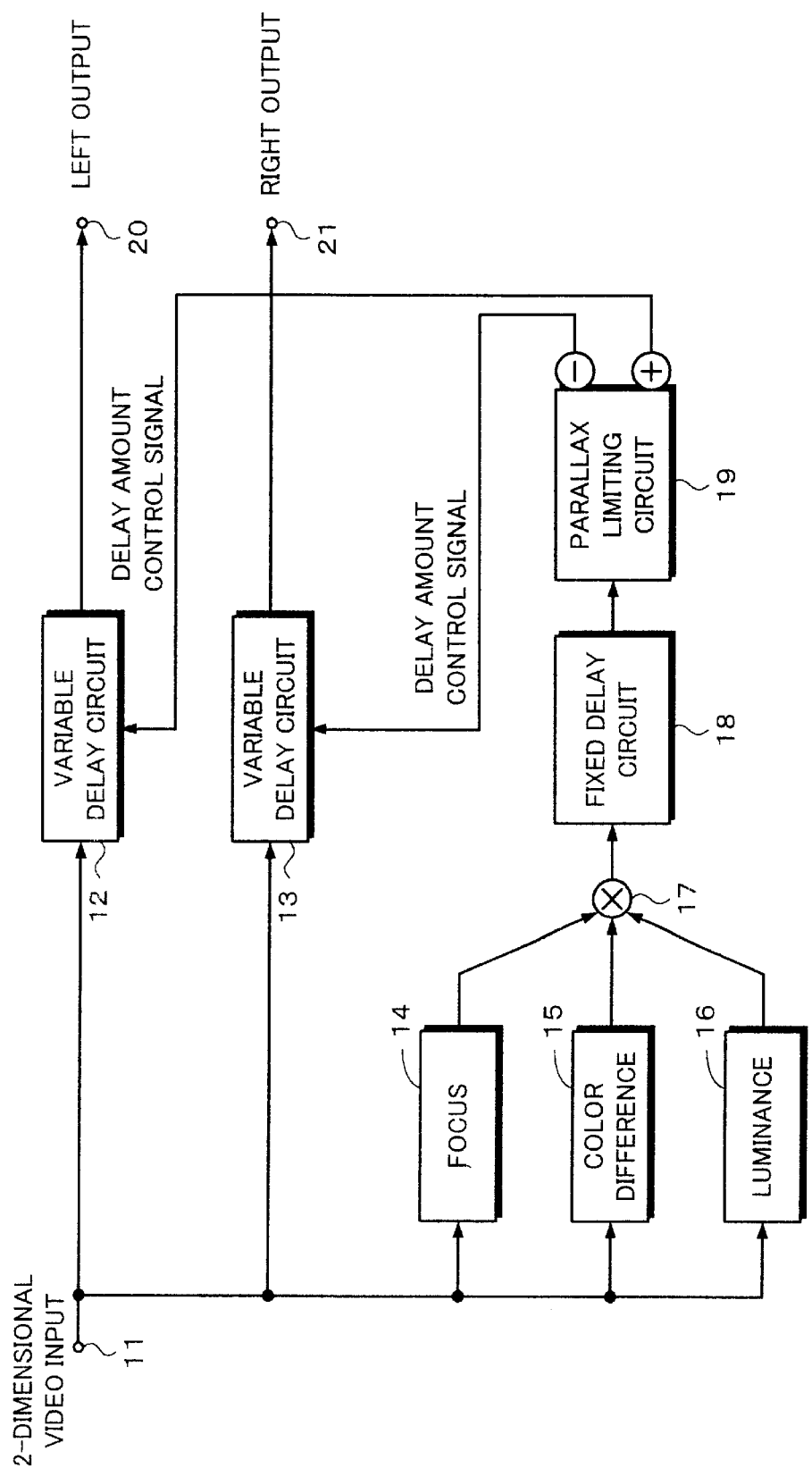
FIG. 2 is a block diagram of an embodiment in which 2-dimensional video images are converted to a 3-dimensional video image and to which the invention is applied.

FIG. 2 shows a block diagram of an embodiment in which a video image is converted from a 2-dimensional video image to a 3-dimensional video image. FIG. 2 corresponds to a portion in a range where the video signal is inputted from the input terminal 51 to the matrices 57L and 57R in FIG. 1 mentioned above.

A video signal is inputted from an input terminal 11. The inputted video signal is supplied to variable delay circuits 12 and 13, a foreground/background discriminating circuit 14 based on focusing, a foreground/background discriminating circuit 15 based on color differences, and a foreground/background discriminating circuit 16 based on a luminance.

In the foreground/background discriminating circuit 14 based on focusing, a leading edge of a boundary portion is detected from the supplied video signal, the portion having a sharper leading edge is determined to be an object existing on this side, and a parallax control signal is generated so as to give a larger parallax. In the foreground/background discriminating circuit 15 based on color differences, the portion having a higher saturation is determined to the portion having a higher saturation is determined to be an object existing on this side on the basis of a chroma component of the supplied video signal, and a parallax control signal is generated so as to give a larger parallax. In the foreground/background discriminating circuit 16 based on a luminance, the portion having a higher luminance is determined to be an object existing on this side on the basis of a luminance component of the supplied video signal, and a parallax control signal is generated so as to give a larger parallax. The parallax control signals of the foreground/background discriminating circuits 14, 15, and 16 are supplied to a multiplier 17.

In the multiplier 17, the parallax control signals from the foreground/background discriminating circuits 14, 15, and 16 are multiplied. A parallax control signal as a result of the multiplication is supplied to a fixed delay circuit 18. In the fixed delay circuit 18, the parallax control signal from the multiplier 17 is delayed in order to match the timing to that of the delay time of each of the variable delay circuits 12 and 13. The delayed parallax control signal is supplied to a parallax limiting circuit 19. In the parallax limiting circuit 19, a delay amount control signal for the left video signal and a delay amount control signal for the right video signal are formed from the supplied signal in a manner such that a binocular parallax amount lies within a predetermined value and within a range of an amount such that the existence of the parallax is recognized clearly. The formed left delay amount control signal is supplied to the variable delay circuit 12.

In the variable delay circuit 12, a delay amount according to the delay amount control signal from the parallax limiting circuit 19 is given to the inputted video signal. The delayed video signal is outputted as a left video output from an output terminal 20. In the variable delay circuit 13, a delay amount according to the delay amount control signal from the parallax limiting circuit 19 is applied to the inputted video signal.

Since a video signal path on the right side is similar to that on the left side, its description is omitted. As mentioned above, various clues in the video signal are detected in the foreground/background discriminating circuits 14, 15, and 16 based on the focusing, color differences, and luminance in FIG. 2. Information regarding the boundary portion of the target is extracted from the detected clues and the foreground/background relation of the object is presumed, thereby obtaining the delay amount control signals which are supplied to the variable delay circuits 12 and 13.

Figure 3A:
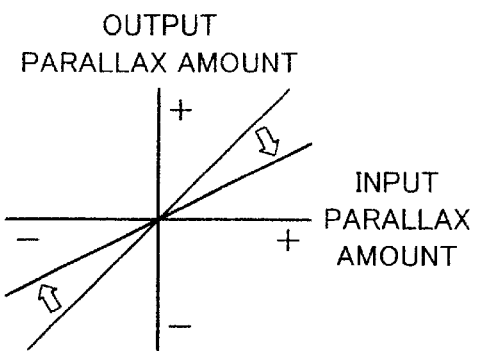
FIGS. 3A to 3D are schematic diagrams showing examples of characteristics of a parallax limiting circuit of the invention.
Figure 3B:
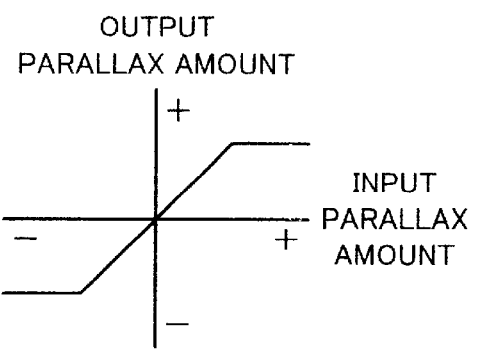
Figure 3C:
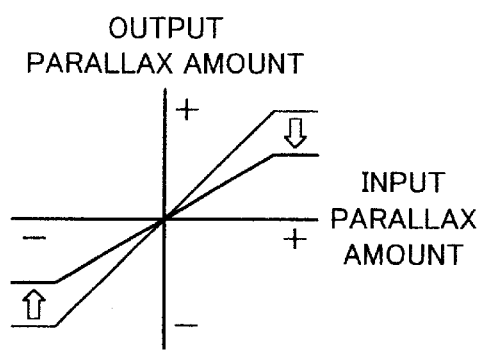
Figure 3D:
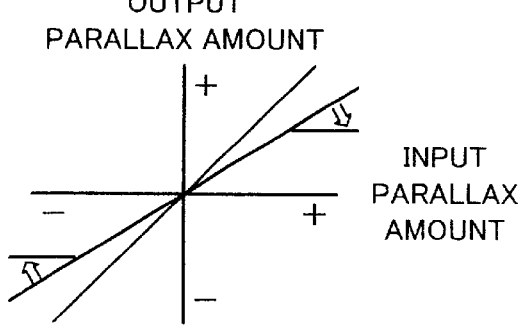

To make the binocular parallax amount lie within the predetermined value, an amplitude of the delay amount control signal which is generated by the parallax limiting circuit 19 is limited so that the maximum amplitude is equal to or less than a predetermined value. As a method of limiting the amplitude, as shown in FIG. 3A, there is a method of making an output amplitude lie within the predetermined value by changing an amplification factor. As shown in FIG. 3B, there is a method of making an output amplitude lie within the predetermined value by a limiter circuit. As shown in FIG. 3C, there is a method of making an output amplitude lie within the predetermined value by limiting an amplitude by a limiter circuit and, thereafter, adjusting an amplitude factor. Further, as shown in FIG. 3D, there is a method of making an output amplitude lie within the predetermined value by a limiter circuit after reducing an amplitude factor.

For example, when the fusion image exists at a position on this side of the display surface, the variable delay circuit 12 performs a delay so as to delay the video signal synchronously with the delay amount control signal from the parallax limiting circuit 19 in accordance with the level of the delay amount control signal. Similarly, the variable delay circuit 13 performs a delay so as to advance the video signal synchronously with the delay amount control accordance with the level of the delay amount control signal.

Thus, the foreground target fused by both eyes is seen as if it were projected to this side of the background and, in this instance, since the amplitude of the control signal is preliminarily limited, the absolute amount of the parallax is suppressed and a natural stereoscopic sense is obtained.

Although the left and right video signals are delayed by the variable delay circuits 12 and 13, one of the variable delay circuits 12 and 13 can be set to a variable delay and the other can be set to a fixed delay.

In case of converting from the 2-dimensional video image to the 3-dimensional video image as mentioned above, for example, the boundary portion having a sharper edge is determined to be an object existing on this side in accordance with a degree of sharpness of the boundary portion in the scanning line of the video signal. When a parallax is given, a natural stereoscopic sense is obtained by suppressing the absolute amount of the parallax to a value within a predetermined amount by a limiter or the like.

A stereoscopic video image can be formed by the relative parallax between the targets by computer graphics by applying the above described embodiment. That is, at the graphics by applying the above described embodiment. That is, at the time of rendering (texture drawing), a parallax is given to each target by considering so as to obtain the relative parallax within a predetermined value from the beginning. For example, the following processes are performed at the stage of rendering.

1. The luminance of the boundary portion of the target serving as a foreground is emphasized.
2. By filtering the background, the boundary portion of it is made inconspicuous.
3. The color contrast of the target serving as a foreground is clarified.
4. The stereoscopic sense of the target is emphasized by shading.

Even in the case where a plurality of targets are overlapped, the parallax is reduced and a natural stereoscopic sense can be obtained by giving the relative parallax in a predetermined range to each target instead of the absolute parallax of each target.

Figure 4:
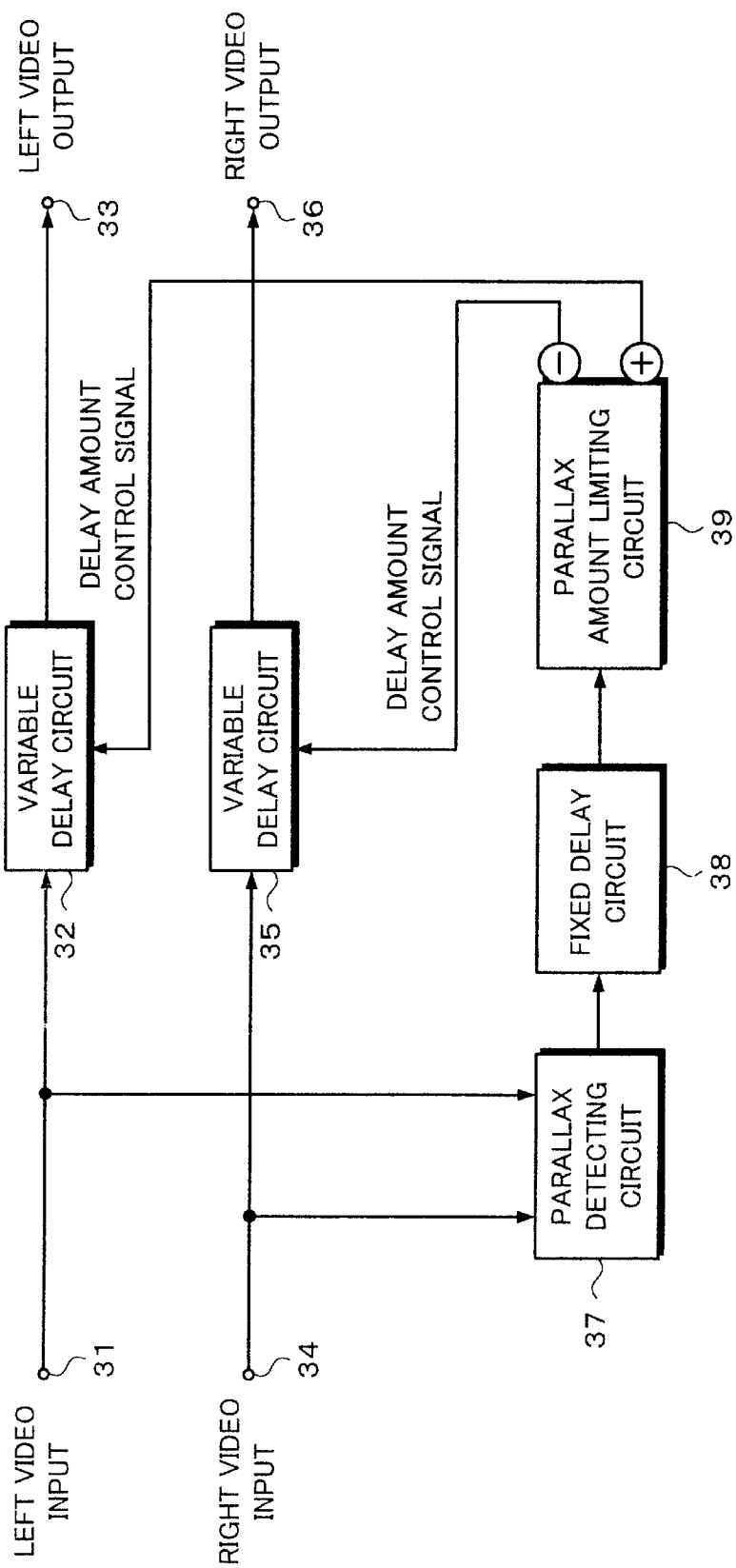
FIG. 4 is a block diagram of the embodiment in which right and left 2-dimensional video images photographed by two cameras are converted to a 3-dimensional video image and to which the invention is applied.

FIG. 4 shows a block diagram of the embodiment in case of converting 2-dimensional video images photographed by two cameras to a 3-dimensional video image. A left video signal is inputted from an input terminal 31. The inputted video signal is supplied to a variable delay circuit 32 and a parallax detecting circuit 37. Since a video signal path on the right side is similar to that on the left side, its description is omitted.

The parallax detecting circuit 37 detects a boundary portion of the same target in the right and left video images by using an algorithm such as a motion vector detection or the like, and generates a signal to control delay time of each of the variable delay circuits 32 and 35 so that a difference between the detected boundary position on the right side and that on the left side lies within a predetermined amount. In the case where the boundary portion of the left video image is located on the left side of that of the right video image, namely, in the case where the target exists at a position far from the point where the right and left visual points coincide, an output of the parallax detecting circuit 37 becomes a signal of a negative polarity in accordance with its amount. When the boundary portions of the video images of both eyes coincide, the boundary portion of the left video image and that of the right video image exist at the point where the visual points of both eyes coincide, so that the output is set to 0. The output of the parallax detecting circuit 37 is supplied to a fixed delay circuit 38.

In the fixed delay circuit 38, in order to match the timing to that of the delay time of each of the variable delay circuits 32 and 35, the parallax control signal from the parallax detecting circuit 37 is delayed. The delayed parallax control signal is supplied to a parallax amount limiting circuit 39. In the parallax amount limiting circuit 39, a delay amount control signal for the left video signal is formed from the supplied signal in a manner such that the binocular parallax amount lies within a predetermined value and within a range of an amount such that the existence of the parallax is recognized clearly. The formed left delay amount control signal is supplied to the variable delay circuit 32.

In the variable delay circuit 32, a delay amount according to the delay amount control signal from the parallax amount limiting circuit 39 is given to the inputted video signal. The delayed video signal is outputted as a left video output from an output terminal 33.

Figure 5A:
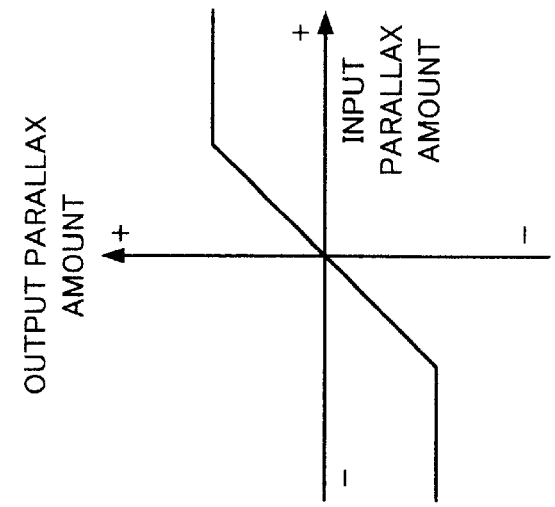
FIGS. 5A and 5B are schematic diagrams showing examples of characteristics of a parallax amount limit control signal generating circuit of the invention.
Figure 5B:
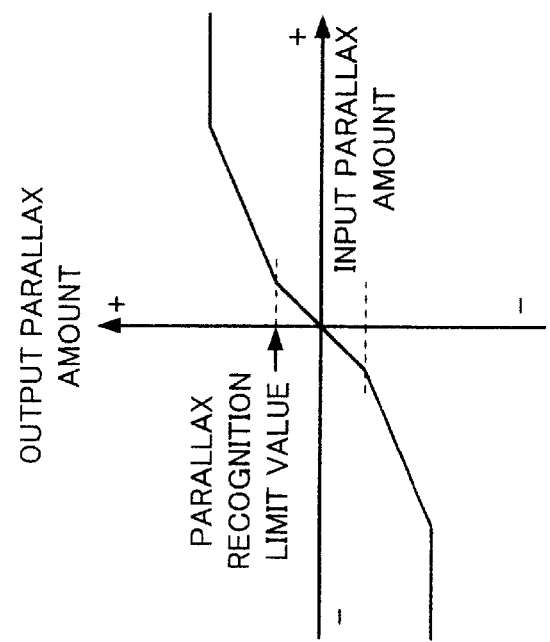

In the embodiment, limiting characteristics of a parallax amount as shown in FIG. 5A are obtained. The limiting characteristics of a parallax amount can be set to characteristics of (linear characteristics+limiter control) as shown in FIG. 5B or the other limiting characteristics.

In the variable delay circuit 32, a delay is performed so as to delay the inputted video signal than fundamental delay time synchronously with the delay amount control signal from the parallax amount limiting circuit 39 in accordance with the level of the delay amount control signal. Similarly, in the variable delay circuit 35, a delay is performed so as to advance the inputted video signal more than fundamental delay time synchronously with the delay amount control signal from the parallax amount limiting circuit 39 in accordance with the level of the delay amount control signal.

As mentioned above, in case of converting the right and left 2-dimensional video images photographed by two cameras to the 3-dimensional video image, a correlation between the left video image and the right video image is obtained, the parallax amount of the boundary portion of the same object is measured, and the parallax amount is adjusted so that the absolute amount of the parallax lies within a predetermined value. Thus, the absolute amount of the parallax is suppressed and a natural stereoscopic sense can be obtained.

Although the processes are performed here so as to obtain a stereoscopic sense after receiving the video signal, the processes can be performed so as to obtain a stereoscopic sense after the photographing and transmit the processed video signal. Specifically speaking, a similar effect can be obtained even by applying the embodiment to the transmitting side. The processes can be also performed so as to obtain a stereoscopic sense on both the transmitting side and the receiving side.

The present invention is not limited to the foregoing embodiments but many modifications and variations are possible within the spirit and scope of the appended claims of the invention.

What is claimed is:

1. A stereoscopic video display apparatus for obtaining a stereoscopic sense of a parallax between right and left eyes of a viewer from an input video signal, comprising:

means for producing a parallax control signal by multiplying outputs of first, second, and third foreground/background discrimination circuits fed with said input video signal, wherein said first foreground/background discrimination circuit discriminates based on a focus, said second foreground/background discrimination circuit discriminates based on color differences, and said third foreground/background discrimination circuit discriminates based on a luminance; and limiting means for limiting said parallax control signal to produce a relative parallax of a value within a predetermined range.

2. The apparatus according to claim 1, wherein when a plurality of targets forming images in said input video signal are overlapped, said relative parallax is produced for each of said plurality of targets.

3. The apparatus according to claim 1, wherein said limiting means produces said relative parallax by limiting an amplitude of said parallax control signal by reducing an amplification factor thereof.

4. The apparatus according to claim 1, wherein said limiting means produces said relative parallax by limiting an amplitude of said parallax control signal by using a limiter.

5. The apparatus according to claim 1, wherein said limiting means produces said relative parallax by reducing an amplification factor thereof and subsequently by limiting an amplitude using a limiter.

6. The apparatus according to claim 1, wherein said limiting means limits said parallax control signal by limiting an amplitude using a limiter and subsequently reduces an amplification factor thereof.

7. A stereoscopic video display method for obtaining a stereoscopic sense of a parallax between right and left eyes of a viewer from an input video signal, comprising the steps of:

producing a parallax control signal by multiplying outputs of first, second, and third foreground/background discrimination circuits fed with said input video signal, wherein said first foreground/background discrimination circuit discriminates based on a focus, said second foreground/background discrimination circuit discriminates based on color differences, and said third foreground/background discrimination circuit discriminates based on a luminance; and limiting said parallax control signal to produce a relative parallax of a value within a predetermined range.

8. The method according to claim 7, wherein when a plurality of targets forming an image are overlapped, said relative parallax is produced for each of said plurality of targets.

9. A method according to claim 7, wherein said limiting step limits an amplitude by reducing an amplification factor.

10. The method according to claim 7, wherein said limiting step limits an amplitude using a limiter.

11. The method according to claim 7, wherein said limiting step reduces an amplification factor and subsequently limits an amplitude using a limiter.

12. The method according to claim 7, wherein said limiting step includes limiting an amplitude using a limiter and subsequently reduces an amplification factor.

* * * * *